US006587744B1

(12) United States Patent
Stoddard et al.

(10) Patent No.: US 6,587,744 B1
(45) Date of Patent: Jul. 1, 2003

(54) RUN-TO-RUN CONTROLLER FOR USE IN MICROELECTRONIC FABRICATION

(75) Inventors: Kevin D. Stoddard, Phoenix, AZ (US); Bradley D. Schulze, Phoenix, AZ (US); Konstantinos Tsakalis, Chandler, AZ (US)

(73) Assignee: Brooks Automation, Inc., Chelmsford, MA (US)

( * ) Notice: Subject to any disclaimer, the term of this patent is extended or adjusted under 35 U.S.C. 154(b) by 266 days.

(21) Appl. No.: 09/599,357

(22) Filed: Jun. 20, 2000

Related U.S. Application Data

(60) Provisional application No. 60/168,984, filed on Dec. 3, 1999, and provisional application No. 60/140,434, filed on Jun. 22, 1999.

(51) Int. Cl.[7] ................................................ G06F 19/00

(52) U.S. Cl. ............................ 700/121; 700/7; 700/17; 700/45; 700/95; 700/29; 700/30; 700/31; 438/5; 438/14; 438/17; 714/51

(58) Field of Search ............................ 700/29, 30, 31, 700/121, 95, 7, 17, 45; 438/5, 14, 17; 714/51

(56) References Cited

U.S. PATENT DOCUMENTS

| | | | | | |
|---|---|---|---|---|---|
| 4,700,311 | A | | 10/1987 | Tributsch et al. | 364/468 |
| 4,819,176 | A | | 4/1989 | Ahmed et al. | 364/468 |
| 5,196,997 | A | | 3/1993 | Kurtzberg et al. | 364/152 |
| 5,283,746 | A | | 2/1994 | Cummings et al. | 364/468 |
| 5,347,460 | A | | 9/1994 | Gifford et al. | 364/468 |
| 5,408,405 | A | | 4/1995 | Mozumder et al. | 364/151 |
| 5,492,440 | A | | 2/1996 | Spaan et al. | 409/80 |
| 5,495,417 | A | | 2/1996 | Fuduka et al. | 364/468 |
| 5,526,293 | A | | 6/1996 | Mozumder et al. | 364/578 |
| 5,546,312 | A | | 8/1996 | Mozumder et al. | 364/468.03 |
| 5,571,582 | A | | 11/1996 | Katoh | 428/35.5 |
| 5,654,895 | A | | 8/1997 | Bach et al. | 364/482 |
| 5,658,423 | A | | 8/1997 | Angell et al. | 438/9 |
| 5,661,669 | A | | 8/1997 | Mozumder et al. | 702/84 |
| 5,710,700 | A | * | 1/1998 | Kurtzberg et al. | 700/29 |
| 5,859,964 | A | * | 1/1999 | Wang et al. | 714/48 |
| 5,901,059 | A | * | 5/1999 | Tao et al. | 700/29 |
| 5,926,690 | A | * | 7/1999 | Toprac et al. | 438/17 |
| 5,993,043 | A | * | 11/1999 | Fujii | 700/121 |
| 6,110,214 | A | * | 8/2000 | Klimasauskas | 703/2 |
| 6,148,239 | A | * | 11/2000 | Funk et al. | 700/1 |
| 6,197,604 | B1 | * | 3/2001 | Miller et al. | 438/5 |
| 6,263,255 | B1 | * | 7/2001 | Tan et al. | 700/121 |
| 6,424,876 | B1 | * | 7/2002 | Cusson et al. | 700/51 |
| 6,446,022 | B1 | * | 9/2002 | Coss et al. | 700/109 |

* cited by examiner

*Primary Examiner*—John Follansbee
*Assistant Examiner*—Thomas Pham
(74) *Attorney, Agent, or Firm*—Perman & Green, LLP

(57) ABSTRACT

A automated run-to-run controller for controlling manufacturing processes comprises set of processing tools, a set of metrology tools for taking metrology measurements from the processing tools, and a supervising station for managing and controlling the processing tools. The supervising station comprises an interface for receiving metrology data from the metrology tools and a number of variable parameter tables, one for each of the processing tools, collectively associated with a manufacturing process recipe. The supervising station also includes one or more internal models which relate received metrology data to one or more variables for a processing tool, and which can modify variables stored in the variable parameter table to control the process tools using feedback and/or feed-forward control algorithms. Feed-forward control algorithms may, in certain embodiments, be used to adjust process targets for closed loop feedback control. The supervising station may have a user interface by which different feedback or feed-forward model formats (single or multi-variate) may be interactively selected based upon experimental or predicted behavior of the system, and may also permit users to utilize their own models for run-to-run control.

56 Claims, 10 Drawing Sheets

VPT FORMAT

| VARIABLE | MIN | MAX | FORMAT | MAX Δ | DEFAULT | ACCESS |
| --- | --- | --- | --- | --- | --- | --- |
| | | | | | | |
| | | | | | | |
| | | | | | | |
| | | | | | | |

RUN-TO-RUN CONTROLLER FOR USE IN MICROELECTRONIC FABRICATION

CROSS-REFERENCE TO RELATED APPLICATIONS

This application is a Provisional application of U.S. Provisional Application Ser. No. 60/140,434, filed on Jun. 22, 1999, and of U.S. Provisional Application Ser. No. 60/168,984, filed on Dec. 3, 1999, both of which are hereby incorporated by reference as if set forth fully herein.

BACKGROUND OF THE INVENTION

1) Field of the Invention

The field of the present invention pertains to microelectronic circuit fabrication and, more particularly, to methods and apparatus for controlling microelectronic circuit fabrication processes.

2) Background

The quality of microelectronic circuits and/or components, such as those manufactured from a semiconductor wafer, is directly dependent on the consistency of the processes used in its fabrication. More particularly, production of such circuits and/or components requires reproducible etching, deposition, diffusion, and cleaning processes. A failure to maintain control of the processes within defined manufacturing tolerances results in decreased yield and decreased profitability for a fabrication facility.

In a typical scenario, the manufacturing process exhibits slow drifts that change the batch-to-batch properties of the product. Very often, these effects are due to slight variations in the operation of one or more processing tools over the time in which the different batches are processed. Additionally, in large scale operations, the same processing operation may be executed on a plurality of processing tools of the same type to process parallel batches of the product. The same processing recipe is generally used to concurrently control the operations of the plurality of similar processing tools. However, minor variations in the way in which an individual tool responds to the recipe parameters to execute the process can drastically affect the resulting product performance when compared with products processed on other ones of the similar processing tools.

Traditionally, this problem has been handled manually by a human operator, using statistical process control (SPC) concepts. More particularly, a human operator monitors the product output as the result of the execution of a process recipe on a particular tool and tweaks the recipe for subsequent product runs. In many instances, however, the process recipes can number in the hundreds. As such, monitoring and manually adjusting these recipes for process drift can be very time consuming, error prone and lacking in accuracy.

A common methodology for monitoring batch processes utilizes x-bar/s or x-bar/r plots in commercial or internally developed SPC software packages. Normally, distributed process data is typically monitored automatically utilizing a set of rules (such as Western Electric) to determine if the process is "in-control." Manual investigation and adjustment of the process is necessary once a data point is determined to be out of control. A large percentage of these adjustments are made to compensate for the run-to-run variations attributed to process equipment drift. Unfortunately, there are many problems using manually adjusted processes based on SPC charts. A typical wafer fabrication plant may have about 2,500 on-line SPC charts. If all of the Western Electric rules were used, and if just two new points were added to each chart per day, it is estimated that there would be on average 82 false alarms per day. Due to the sheer magnitude of faults that are reported in such circumstances, only the processes with the most significant excursions tend to be maintained. In some cases, however, the opposite is true, and too much attention is given to a chart, leading to over-adjustment of data points which in turn results in processes "ringing." Additional process variation can be introduced between shifts or individuals as they all try to compensate for each other's process adjustments, compounding the problem.

The present inventors have recognized the foregoing problems and have developed an advanced run-to-run controller suitable for use in a microelectronic fabrication facility.

SUMMARY OF THE INVENTION

The invention provides in one aspect an advanced run-to-run controller for use in microelectronic fabrication.

In one embodiment, an advanced run-to-run controller for controlling manufacturing processes comprises set of processing tools, a set of metrology tools for taking metrology measurements from the processing tools, and a supervising station for managing and controlling the processing tools. The supervising station comprises an interface for receiving metrology data from the metrology tools and a number of variable parameter tables, one for each of the processing tools, collectively associated with a manufacturing process recipe. The supervising station also includes one or more internal models which relate received metrology data to one or more variables for a processing tool, and which can modify variables stored in the variable parameter table to control the process tools using feedback and/or feed-forward control algorithms. Feed-forward control algorithms may, in certain embodiments, be used to adjust process targets for closed loop feedback control.

In a preferred embodiment, the supervising station has a user interface by which different feedback or feed-forward model formats (single or multi-variate) may be interactively selected based upon experimental or predicted behavior of the system. The supervising station may also permit users to utilize their own models for run-to-run control.

Further variations, modifications and alternative embodiments are also described herein.

BRIEF DESCRIPTION OF THE DRAWINGS

FIG. 7 is a diagram showing the contents of a preferred variable parameter table (VPT).

DETAILED DESCRIPTION OF PREFERRED EMBODIMENTS

An advanced run-to-run controller (ARRC) system is set forth herein that provides a formal methodology recipe adjustment to compensate for gradual process drift and/or upstream process variation. This functionality assists in significantly reducing the engineering time required for process maintenance and adjustment.

Figure 1A:
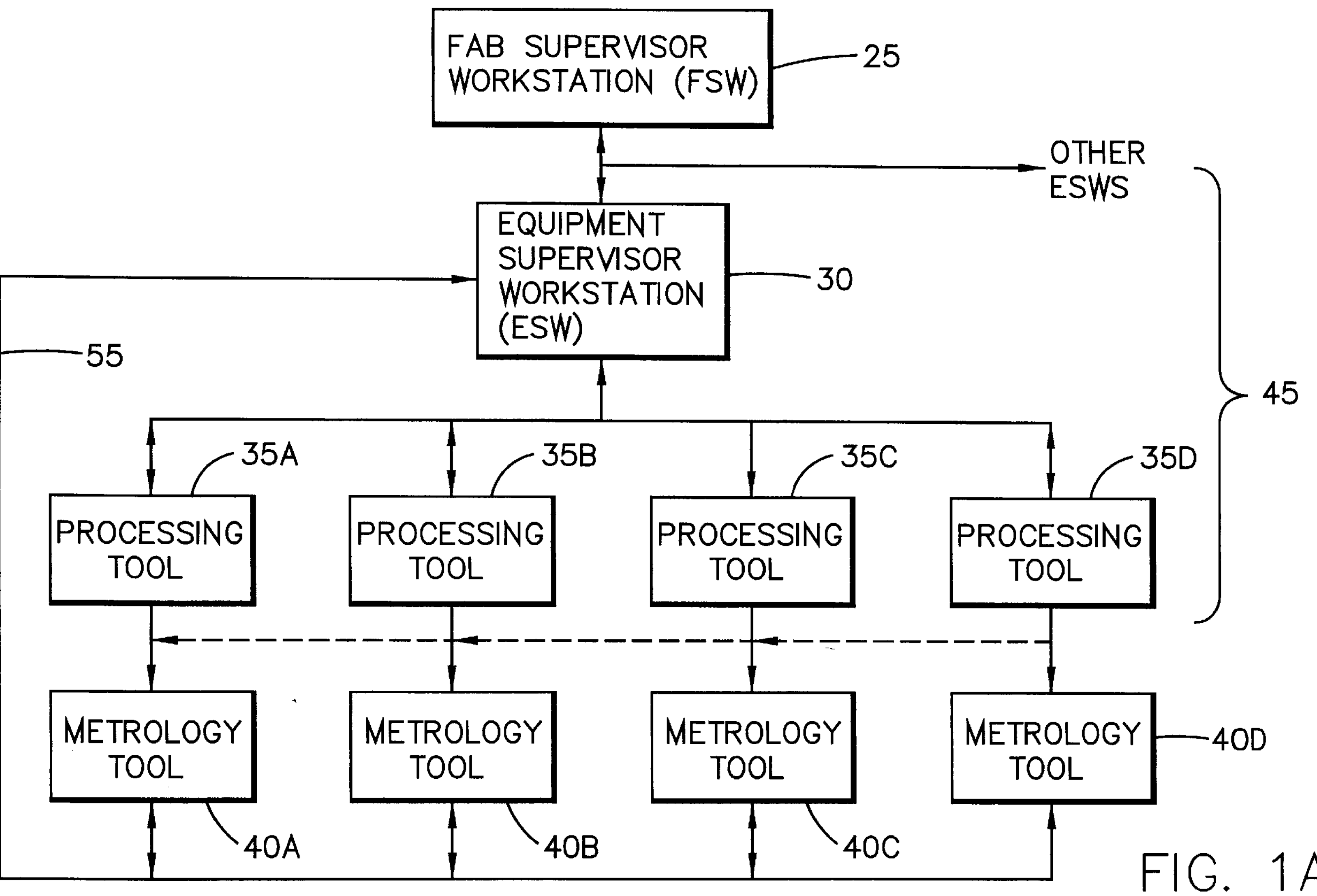
FIG. 1A is a schematic block diagram of a hardware platform on which the run-to-run controller of the present invention may be executed.

One embodiment of a processing platform architecture that may be used to implement the disclosed ARRC system is set forth in FIG. 1A. In the illustrated embodiment, the platform architecture, shown generally at 20, is comprised of a Fabrication Supervisor Workstation (FSW) 25, one or more Equipment Supervisor Workstations (ESW) 30, one or more processing tools 35, and one or more metrology tools 40. The metrology tools 40 may either be in-situ or ex-situ in nature.

The FSW 25 monitors and controls the overall operation of the microelectronic fabrication facility. One or more operators may monitor the operation of all or a substantial portion of the tools used throughout the fabrication facility. Based on the operations monitored at the FSW 25, the operator may control the tool sets and, further, direct the processing recipes that are to be used by one or more tool sets in the fabrication of the product.

An equipment tool set is shown generally at 45 of FIG. 1A. The equipment tool set 45 includes one or more processing tools 35 that are connected for bilateral communication with a common ESW 30. Processing tools 35 are generally of the same type. For example, all of the processing tools 35 may be furnaces. However, it will be recognized that processing tools 35 may include different tool types which be grouped based upon the type of processes that are to be executed upon the workpieces to fabricate the end products.

The ESW 30 is preferably configured to accept processing recipes from the FSW 25 and to direct processing tools 35 in the execution of the processing recipes. In those instances in which processing tools 35 are of the same tool type, the FSW 25 may provide a single processing recipe to the ESW 30, which recipe is to be concurrently used by all of the processing tools 35 for parallel batch processing. Alternatively, the ESW 30 may receive different recipes for one or more of the processing tools 35, in which case processing tools 35 may be tools of the same type or of different types. Processing tools 35 are subject to inter-tool deviations of the execution of a single recipe on more than one tool as well as run-to-run, intra-tool deviations in the execution of a single recipe over time. Accordingly, the ESW 30 includes a Variable Parameter Table (VPT) associated with each of the processing tools 35, as illustrated, for example, in FIG. 5. The VPT 37 includes the parameters that are used in the execution of a processing recipe by a given processing tool. The parameters of the VPT 37 are based on the particular characteristics of the associated tool 35 and, as such, will frequently differ between the tools of the same type. In general, each fabrication process is comprised of one or more recipes (one recipe per process step), and each recipe will involve one or more processing tools 35, each processing tool 35 having a VPT 37 for all of the process recipes.

The parameters of the VPT 37 are calculated and updated based on metrology data for the particular process implemented by the associated processing tool. To this end, FIG. 1A illustrates the use of one or more metrology measurement units 40 that receive workpieces from one or more respective tools 35 and measure the physical characteristics of the workpieces processed by the processing tools 35. In the illustrated embodiment, a plurality of metrology measurement units 40*a*–40*d* are employed, each metrology measurement unit being respectively associated with one of the processing tools. However, it will be recognized that such a one-to-one correspondence is not absolutely necessary. Rather, depending on the particular processing tools utilized, one or more of the processing tools 35 may use a single metrology measurement unit in order to economize on capital costs and space.

Figure 5:
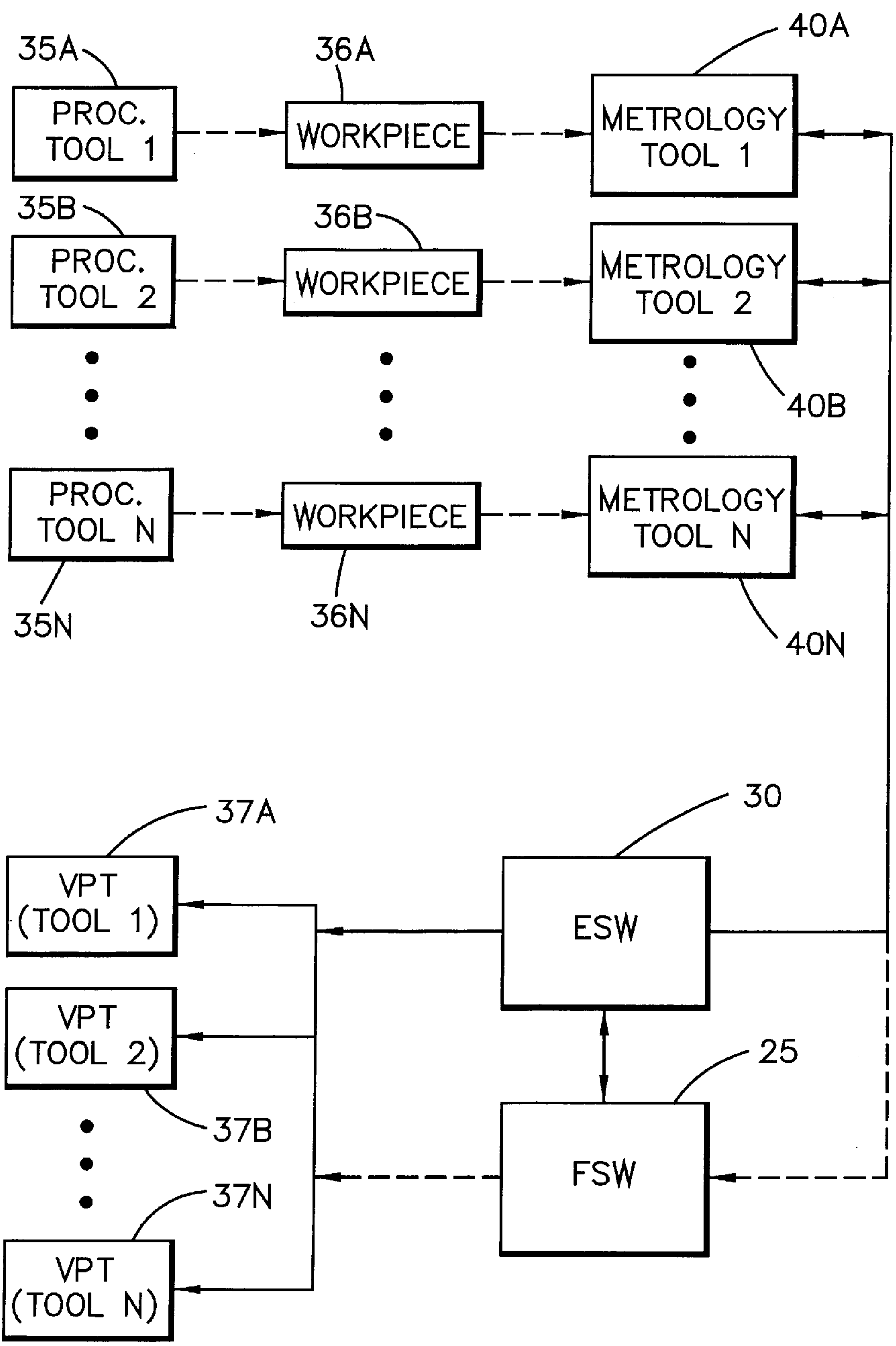
FIG. 5 is a block diagram illustrating the update of variable parameter tables (VPTs) associated with the various processing tools, for use in run-to-run control processes.

In operation, as illustrated in FIG. 5, microelectronic workpieces 36 are transported from each processing tool 35 to a corresponding metrology measurement unit 40. This transportation, illustrated at lines 50, may include an automatic or manual transportation of the workpieces 36. Each metrology measurement unit 40 is designed to measure one or more physical and/or electrical characteristics of the workpiece 36 processed by the associated processing tool 35. The measurement data is then made available to the ESW 30 along, for example, a communication bus 55 or the like. Once the measurement data has been provided by the metrology measurement unit 40, the ESW 30 may update the VPT 37 for the particular tool 35 that processed the workpieces 36 measured by the metrology measurement unit 40.

Figure 1B:
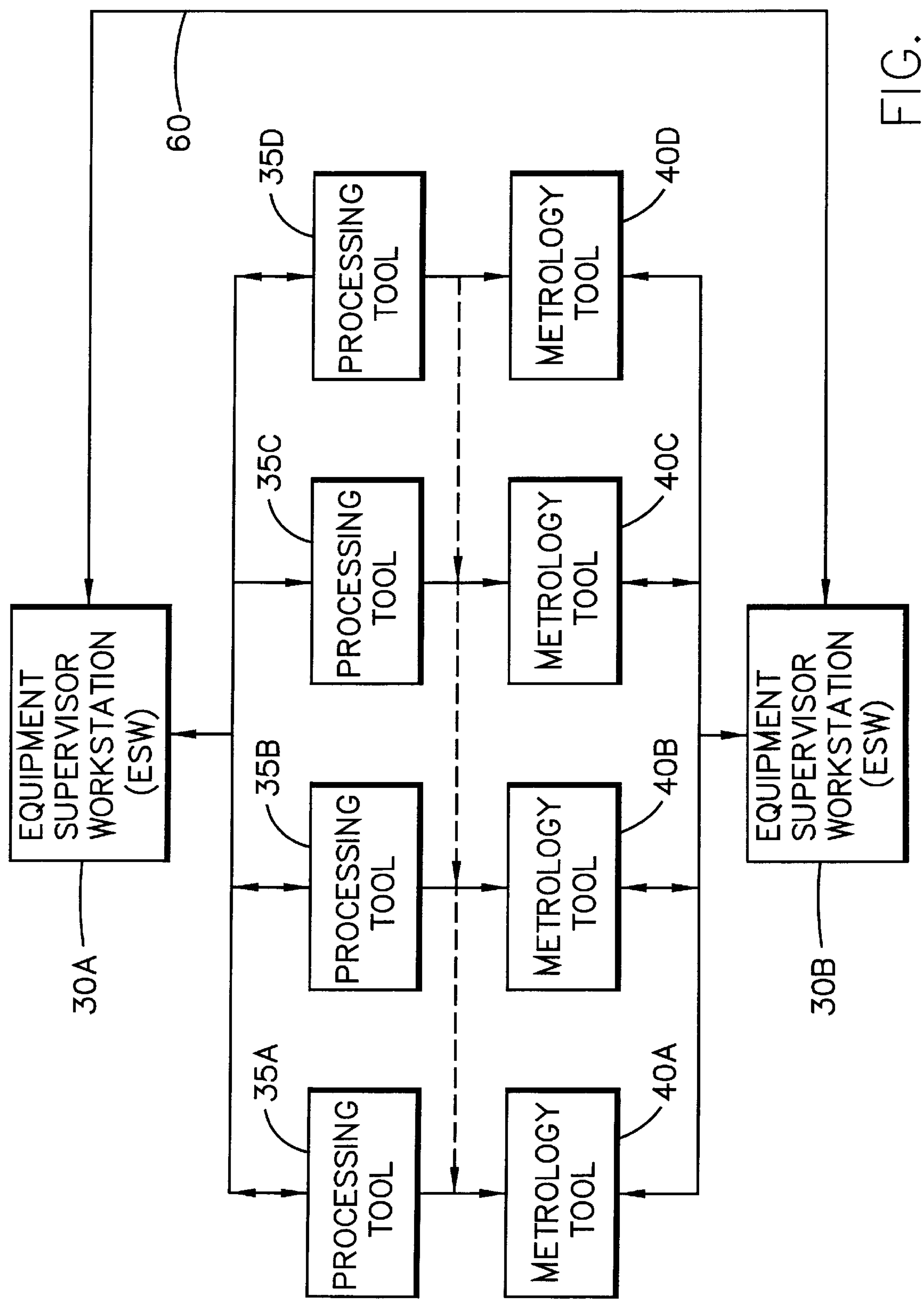
FIG. 1B is a schematic block diagram of a further hardware platform on which the run-to-run controller of the present invention may be executed.

FIG. 1B illustrates a further system architecture that may be used in those instances in which the at least two ESWs 30*a* and 30*b* are employed. The first ESW 30*a* is preferably associated with one or more processing tools 35 while a second ESW 30*b* is preferably used to control one or more metrology measurement units 40. The second ESW 30*b* communicates the metrology data to the first ESW 30*a* along a communication bus 60 or the like. The metrology data received by ESW 30*a* is then used to calculate and/or adjust the parameters of the VPTs 37 associated with the processing tools 35*a*–35*d*.

The Advanced Run-to-Run Controller (ARRC) system preferably provides a formal methodology for recipe adjustment to compensate for gradual process drift (feedback control) and upstream process variation (feed-forward control). Additionally, other control modes of operation may be employed such as, for example, combined feedback/feed-forward control and adjustable feedback control, as illustrated in FIG. 6, described later herein. In each instance, the functionality significantly reduces engineering time required for process maintenance and adjustment.

In the case of feedback control, the ARRC system preferably provides automatic adjustment of the recipe through the parameters all of the VPT (e.g., VPT 37 shown in FIG. 5) based on the measured process results from the current process. This automatic adjustment is accomplished in part by modeling the process using measurements from past experience, first principles, or a design of experiment. With such a model, a controller can make intelligent decisions as to what variables to change in the recipe through the VPT to maintain the desired process target.

In the case of feed-forward control, the ARRC system can use metrology measurements from a previous process step to make adjustments to either the process target or a process variable (recipe parameter) to correct for problems upstream in the processing sequence. This is accomplished by empirically modeling the relationship between either two process measurements or a process measurement from a past process and a recipe parameter in the current process.

Figure 2:
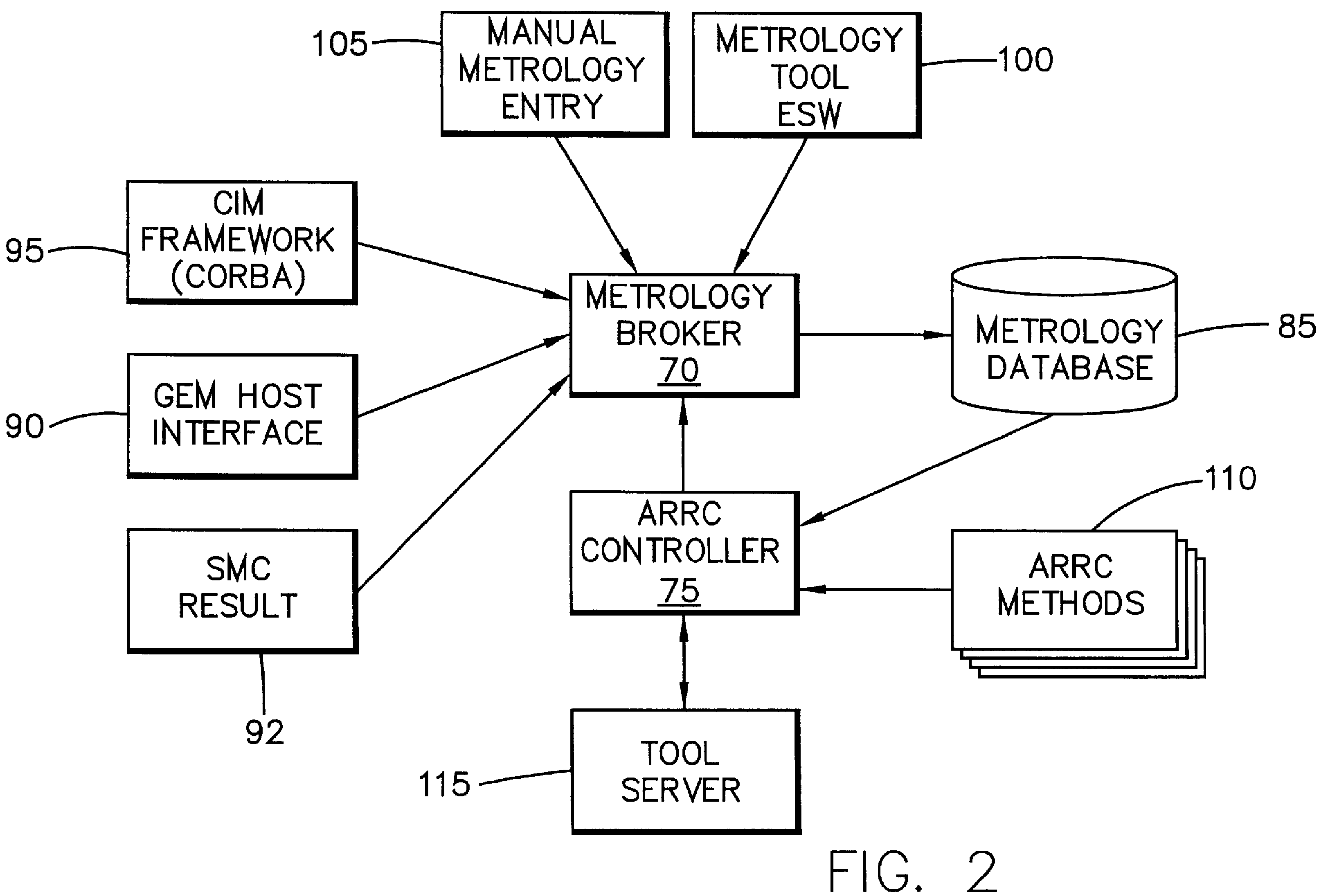
FIG. 2 is a diagram illustrating one embodiment of the software components that may be used to execute the run-to-run controller of the present invention.

FIG. 2 illustrates an exemplary software framework for the exchange of metrology information and calculation/updating of the parameters of the VPT tables 37 (see FIG. 5). The ARRC system illustrated in FIG. 2 is preferably designed to take full advantage of a communication framework using a standardized interface, such as CORBA. This framework allows for the exchange of metrology information between ESWs with or without an FSW since the metrology requests preferably comprise CORBA objects. All metrology information may then be stored locally on the ESW associated with the processing tool and can be accessed via the communication framework by any other ESW in the case of feed-forward control. In such instances, metrology is not stored on the FSW, thus avoiding a single point of failure.

Further details will now be set forth concerning metrology acquisition, storage and maintenance, after which will be described further details concerning run-to-run control using the metrology data.

The acquisition of metrology data (i.e., process measurements) can be difficult for a variety of reasons. For example, the particular metrology measurement unit may not have external communication. In such instances, manual entry of the process results must be undertaken. Manual entry, however, is tedious, highly susceptible to data entry errors, and not the preferred manner of obtaining metrology information in the system. Another obstacle with implementing such a system is the acquisition of the process measurements in a timely manner. It may be anywhere from an hour to several days before the results from the latest run are obtained or are otherwise made available to the ESW. Since each fabrication facility stores and analyzes the process results in a different way, it can be quite challenging to provide a standard interface to acquire this information without writing special code for each customer. The software architecture illustrated in FIG. 2 is designed to overcome or mitigate the above obstacles. A description of each of the functional modules, as they relate to metrology acquisition, storage, and maintenance, follows below.

With reference to FIG. 2, a Metrology Broker 70 is used to manage all of the metrology acquisition requests provided by an ARRC Controller 75. Each metrology acquisition request from the ARRC Controller 75 is associated with a metrology map defining the method of acquiring the metrology results. Once the metrology information is acquired, it is stored in a Metrology Database 85 along with the Date, Time, Tool, MiniSpec, Lot ID and Run Number. The requesting ARRC Controller 75 will also be notified of the acquisition of the metrology results when it occurs.

The metrology map is the vehicle that allows the user to define the method of acquiring the process measurements as well as the format in which they are presented. The user can define the number of wafers and sites (process measurement locations) and define more specific names for the metrology points.

Various automated methods of obtaining process measurement results may be used and defined in the metrology map. With reference to FIG. 2, the automated methods include, for example, the following:

GEM Interface 90—A standardized GEM interface may be provided to transfer the process measurements into a high performance database and to provide the measurements to the ARRC system. This method generally requires that the users at the fabrication facility write custom code to interface their process measurement database to a supervisory workstation, such as an ESW.

CIM Framework (CORBA Interface) 95—This interface is provided for customers with process measurement tools or a SPC database that is compliant with Sematech's APC Framework. For the CIM Framework 95, the ESW 30 subscribes to a CORBA object to automatically obtain the process measurements as they are measured.

ESW Metrology Tool Interface 100—This interface is provided for users at fabrication facilities who wish to connect an ESW directly to the metrology tool for the purpose of run-to-run control.

SMC Result—This interface allows linkage to a Statistical Machine Control application which provides automated fault detection using the equipment real-time measurements. Calculations from this application may generally be provided to the ARRC system as measurements from real-time sensors.

In addition to the foregoing automatic metrological acquisition methods, the ARRC system may also employ a Manual Metrology Entry interface 105. Here, a user interface is provided to manually enter the process measurements of the metrology tool for fabrication facilities that do not have a centralized SPC database or that have process measurement tools without external communication capabilities. Although not generally the most efficient manner of acquiring metrology data, this functionality is especially useful for users who wish to validate the functionality of the ARRC system without committing resources to code a GEM or CORBA compliant interface to establish a link with the metrology tools or SPC database.

Preferably, the Manual Metrology Entry interface 105 allows the user to select an open metrology request and then enter new data, preferably in a Unix® environment. The user interface window preferably contains a scrollable list of open metrology requests and displays the following information about each request: date, time, tool, lot ID, and recipe name. Because there may be a multitude of open metrology requests, the following three fields may be used to narrow the search: tool, recipe name and lot ID. Any name or portion of a name followed by an asterisk can be entered to automatically filter the available selections. After all metrology values have been entered for a particular request, the ARRC Controller 75 will be notified of the acquisition of the data and can process the data accordingly.

Metrology Database 85 is preferably in the form of a proprietary, flat file database, although other database structures (e.g., relational databases) may be used instead. The Metrology Database 85 is used to store and maintain the process measurement results. These values are generally not stored in the standard database of the ESW 30 since often it is necessary to store measurement information on the order of ten times longer than the real-time process data stored in the standard ESW database. An abundance of process measurements should preferably be made available for statistical analysis of the process and for allowing robust modeling of the process. Separate database clean up and maintenance operations may also be provided for the Metrology Database 85.

Each ESW 30 may comprise an equipment supervisory workstation of the type such as available from SEMY Engineering, Inc., of Phoenix, Ariz. Integrating run-to-run functionality in such a workstation may require the addition of several hooks to the existing ESW software. Implementation is preferably achieved by associating run-to-run control methods 110 to values defined in the VPT. This association process allows the user to define adjustable variables in the recipe for each individual tool.

Interaction between the processing tools 35 and ESW is a controlled by a tool server 115. The tool server 115, in turn, interacts with the ARRC Controller 75.

The ESW 30 may provide visual access to the VPT, including a display of parameters, visible minimum and maximum limits, maximum change per step, access levels per parameter and parameter type designations with units (see FIG. 7). The ESW 30 thus augments the VPT with an interface that allows the user to select the method by which each variable parameter is calculated/updated. As such, the user may define a custom tailored run-to-run control algorithm for each parameter if so desired. Each VPT parameter is designated with one of the following ARRC adjustment methods: feedback only, adjustable feedback, combined feedback/feed-forward, feed-forward only, or none. In a preferred ARRC system, there are four possible adjustment modes available for each adjustment method. They are:

Automatic—this mode will automatically make changes to the variable parameter based on the recommendations of the model and controller.

Manual Verification—this mode will ask the operator to approve of the recommended variable parameter changes.

Manual—this mode will predict the process results from the process model and controller without making adjustments to the variable parameter. This mode may be useful to test the validity of a model without effecting the process. This mode will also allow the operator to approve and make the recommended variable parameter changes manually. A purpose of this mode of operation is to allow the operator to become comfortable with the adjustments made by the process model and controller before making the adjustments automatically.

Data Collection—this mode is used to acquire only the process measurement data which is required for a feed-forward process where the upstream process tool is connected to an ESW and does not have a feedback controller defined.

The ARRC Controller 75 interacts with the tool server 115, the ARRC methods 110, the Metrology Database 85, and the Metrology Broker 70. It is a background software process that performs off-line processing of the ARRC methods 110 after or concurrent with the receipt by the Metrology Database 85 of the process measurement results by way of the Metrology Broker 70. Off-line processing assists in avoiding delay which might be attributable to the ARRC calculations or acquisition of process measurements prior to downloading the adjusted recipe.

Figure 6A:
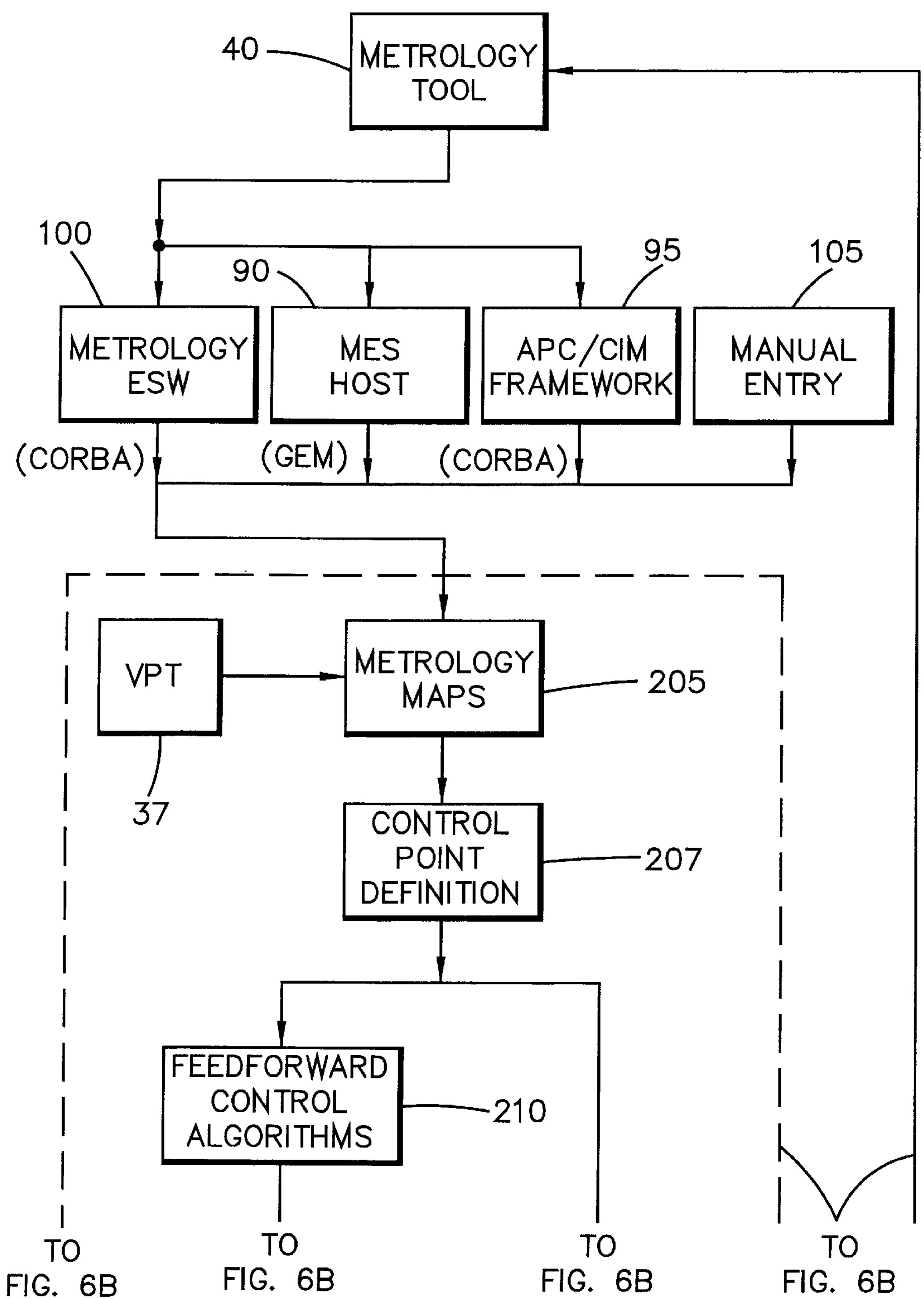
FIGS. 6A and 6B are block diagrams illustrating a run-to-run control process flow in accordance with a preferred embodiment as described herein.
Figure 6B:
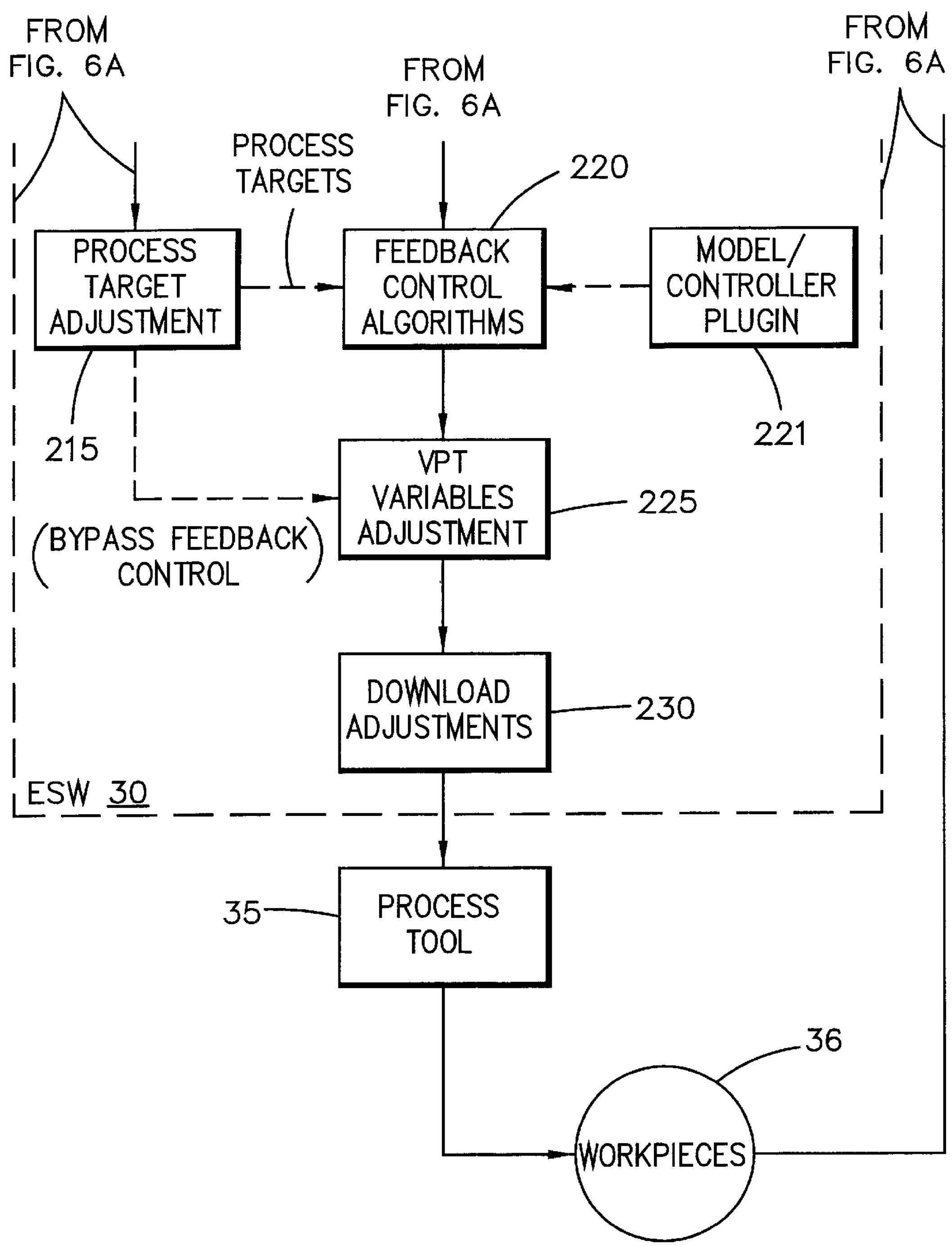

Further description of the run-to-run control methods will now be provided, with occasional reference to the block diagrams of FIGS. 6A and 6B. As previously indicated, a number of means are available for the acquisition of metrology data and the generation of metrology maps. By way of example, automated methods of obtaining process measurement results include use of a standardized GEM Interface 90, a CIM Framework (CORBA) Interface 95, or an ESW Metrology Tool Interface 100. Also, the ARRC system may also employ a Manual Metrology Entry interface 105. The information from these metrology acquisition techniques is supplied to a set of metrology maps 205, which, as noted, are the vehicles which allow the user to define the method of acquiring the process measurements, as well as the format in which they are presented. Using the metrology maps 205, the user can, for example, define the number of wafers and sites (process measurement locations) and define more specific names for the metrology points.

Prior to running a process, whether feedback or feed-forward (or both), the user sets control points for the various process parameters used by the ARRC system, illustrated by control points definition step 207 in FIG. 6A. Setting of the control points is part of a larger mechanism through which the user also defines the process model (particularly for feedback methods) and adaptation algorithm for the selected VPT parameters. The control point definition is provided to allow the user to combine any or all of the process measurements defined by a single metrology map into a single value that the run-to-run control calculation uses to gauge the process. To this end, the user first selects a metrology map for the control point definition. A formula editor, similar to Microsoft Excel, may be provided to allow the user to combine any or all of the values into a single value. All typical mathematical operations are preferably available, in addition to special statistical operations such as mean, standard deviation, median and range. The user can select each measurement from a list defined by the metrology map.

The modeling of the semiconductor process can range from a collection of very complicated partial differential equations to simple relationships between two process variables. Most control systems, however, can effectively use simple models to describe the phenomena which are the subject of their control, since complicated models generally increase computational demands and cause slower system performance.

To provide the user with a flexible range of processing possibilities, a variety of ARRC models 110 (i.e., model formats) may be made available to the user to adaptively or recursively model and control the process. The optimal model format may be determined empirically using, for example, an initial "golden data set." To this end, the user may manually enter a matrix of golden data set process measurements and control variables. Using this experimental process data, a least-squares system identification algorithm may be used to determine the model parameters. Process noise and model integrity metrics may be displayed to quantify the quality of the model. Confidence level indications may also be provided to the user based on how well the model predicts the actual phenomena in order to give the user a sense of the reliability of the model. The overall model selection process can be an iterative process in which the user tries several model structures before finding one that accurately represents the process.

In one embodiment, the model adaptation employs a modified fading-memory least-squares algorithm incorporating dead-zones and parameter constraints. The modifications, together with the ability to perform full or partial adjustment of the parameters, aim to alleviate potential problems due to estimation drift. Such problems can occur when the input-output data used for estimation do not provide sufficient information (excitation) to determine all of the model parameters, e.g., normal production data. The basic control algorithm may be of the gradient-Newton class used to solve non-linear equations. Newton algorithms have excellent convergence properties near the solution but may be susceptible to noise. For this reason, the algorithm is preferably modified with a "dead-zone" non-linear gain adjustment allowing the user to adjust its sensitivity to noise. The main advantage of this modification is that it allows for a quick response to large disturbances without increasing the steady-state variance. Higher order controllers can also be used to compensate for more severe process drifts. Default control parameters are automatically computed based on the model and the input-output data set. These parameters are fully adjustable by the user to refine the control action. A process-metrology tool simulator is also provided to further assist the user in visualizing the operation of the feedback controller and in learning how to adjust the control parameters to achieve the desired behavior, before performing actual process test runs.

In a presently preferred embodiment, at least the following model structure or model format options are provided to the user for interactive selection: (i) linear (2-parameter model—i.e., slope and y-intercept), (ii) quadratic (3-parameter model) and (iii) cubic (4-parameter model). These models can be either single-input, single-output (SISO) or multi-input, multi-output (MIMO). The models can also be defined as least squares adaptive, gradient adaptive or non-adaptive along with the ability to selectively adapt the parameters (i.e. keeping the slope constant while shifting the y-intercept up and down over time). Adaptive models automatically change the model parameters based on the current metrology information being received to automatically compensate for process drift. A recursive controller can be employed to control the process for static models. An external plug-in capability (see model/controller plug-in 221 in FIG. 6B) may also be provided using, for example, MATLAB to allow users to define their own models, adaptation algorithms and controllers.

Furthermore, the "golden model" created from the "golden data set" can be restored as in the case with models that have adapted over time. This restoration can automatically be triggered by the Preventative Maintenance application.

The feedback methods generally provide for a desired process target as well as minimum and maximum specification limits defined by the process specification. The minimum and maximum metrology measurement limits assist in protecting the system from using false measurements. If one or more of the metrology values are outside of these limits, the system can be programmed to either use or discard the individual metrology values. In addition, if the range of the metrology data exceeds a predetermined maximum range value, the system can be programmed to discard all of the metrology information as invalid.

In the same respect, the ARRC system may be programmed to implement warning and/or stop limits based on the number of false metrology values that are detected. In the event the stop limit is exceeded, all future runs for that tool, for example, may then be blocked or a warning may be provided to the user. In the event of a warning, the user may be notified that the number of false metrology values is excessive and the warning may be logged in an audit trail file. If a variable parameter value in the VPT is outside of its own predetermined minimum and maximum limits, it is possible to define a stop on the process or simply adjust the variable parameter value to the minimum or maximum limit, whichever is closest to the out-of-range value.

Since, in some cases, metrology may never be acquired, a warning limit can be defined to warn the user that there is something wrong with the acquisition of the metrology (measurement tool is down, SPC database failure, network problem, etc.). A stop or time out limit may be used so that all future runs are blocked or the run-to-run control will not be used.

As previously indicated herein, the ARRC system preferably provides methods for recipe adjustment to compensate for gradual process drift (feedback control) and upstream process variation (feed-forward control), as well as possibly other control modes of operation such as, for example, combined feedback/feed-forward control and adjustable feedback control. In the case of feedback control, as illustrated in FIG. 6B, the feedback control algorithms 220 are implemented based upon internal model/controller structures or the model/controller plug-in 221 using process results derived from the control point definition 207. After application of the feedback control algorithms 220, as illustrated by a following step 225 in FIG. 6B, the ARRC system preferably provides automatic adjustment of the recipe through the parameters of the VPT 37 based on the process results.

Further protection from false metrology is provided which is dependent on the elapsed time since the last run of a process on the tool. This method of protection from false metrology is particularly useful in connection with processes that have not been run on a particular tool for a substantial period of time. When a predetermined period of time has elapsed since the last run the other process on the tool, it is possible that the model used in the last run model is invalid due to changes in the processing tool over time.

From an operational standpoint, "Feedback Only" processing begins when the tool server 115 (see FIG. 2) receives a processing recipe that is to be executed by one or more of the processing tools 35. After downloading a recipe, the tool server 115 notifies the ARRC Controller 75 of what process measurements to expect at the completion of a process run and, further, advises which of the associated ARRC methods 110 are to be used to update the VPT. Provision may also be made to block subsequent downloads if pre-defined conditions in the ARRC method are violated. Overriding a block download notification preferably requires secured access.

The tool server 115 or GEM Host interface 90 automatically notifies the ARRC Controller 75 that it has downloaded a recipe to the tool and that there are associated ARRC methods. The ARRC Controller 75 monitors for the start and end events of the process and makes sure there were no abort conditions that occurred during the run. Once it has been determined that the process run was completed successfully, the metrology map definition(s) are extracted from the ARRC method(s) 110 to determine which process results should be expected. Once the process results are received, the ARRC method(s) 110 are calculated in the background. In the event the ARRC method 110 makes a changes to a VPT parameter and user approval is required, all changes are stored in a temporary file until approval is received. Otherwise, the VPT changes will be made automatically. Each run, the current VPT variable parameter values are downloaded from the ESW 30 to the corresponding processing tools 35, as indicated by step 230 in FIG. 6B.

In the case of feed-forward control, the ARRC system can use metrology measurements from a previous process step to make adjustments to either the process target or a process variable (recipe parameter) to correct for problems upstream in the processing sequence. In order to carry out this type of adjustment, it is required that the relationship between either two process measurements or a process measurement from a past process and a recipe parameter in the current process be empirically modeled.

The ARRC Feed-Forward Method is very similar to the ARRC Feedback Method from the standpoint of implementation and configuration. Generally stated, the ARRC Feed-Forward Method can be described as a degraded ARRC Feedback Method. In the ARRC Feed-Forward Method, however, there are no target process values nor upper and lower specification limits since the model acts as a relational operator between sequential processes. Additionally, the closed loop adjustment mode is absent because its functionality is used to acquire process measurements for feed-forward control with respect to downstream processes. The time between run limit and number of runs without metrology limit functionality is absent since metrology is generally always required in a feed-forward control methodology.

For feed-forward methods, the Control Point Definition Editor is enhanced with a special field to define from which upstream process the metrology information is coming from. The Process Model Editor does not have the capability to define adaptive models or recursive controllers for feed-forward methods, since the models used for feed-forward control are completely open loop.

When the "feed-forward only" method is used, the tool server 115 (see FIG. 2), or alternatively the GEM Host interface 90, if provided, notifies the ARRC Controller 75 to acquire the specified metrology data from the upstream metrology tool and execute the feed-forward algorithm. In the event that the metrology record from the upstream metrology tool is not available, the download of updated recipe parameters will be blocked until it is acquired. Once the metrology record has been retrieved, the ARRC method(s) will be calculated and the VPT parameters updated.

When the combined feedback/feed-forward control is used, outputs from the feed-forward control methods 210 may be used to adjust process targets for the feedback control methods 220, as illustrated in FIG. 6B.

After successfully executing any of the foregoing ARRC methods, the following information is recorded: VPT parameter value, metrology target, calculated control point, and new model parameters. All alarm and stop events generated by the ARRC methods are stored in the audit trail file and also displayed to the user in a tool status application. The alarms can be cleared in either the tool status or ARRC Status applications, however the stop events can only be overridden in the ARRC Status application (as explained in a section to follow). Any adjustments to the VPT parameters are also logged in the audit trail file.

An ARRC Status display may be provided to view the current status (i.e. OK, alarm, or block download) of all of the tools connected in the current zone. This application displays the current status of the tool with the ability to view all of the open metrology requests as well as all of the current ARRC system events. From this window, all ARRC system block download events can be overridden to bring the tool back on line. All alarm and block download events are also visible in the tool status display and can also be cleared there. All ARRC system events (alarms, block download, adjustments, etc.) are also recorded in the audit trail file.

Figure 8:
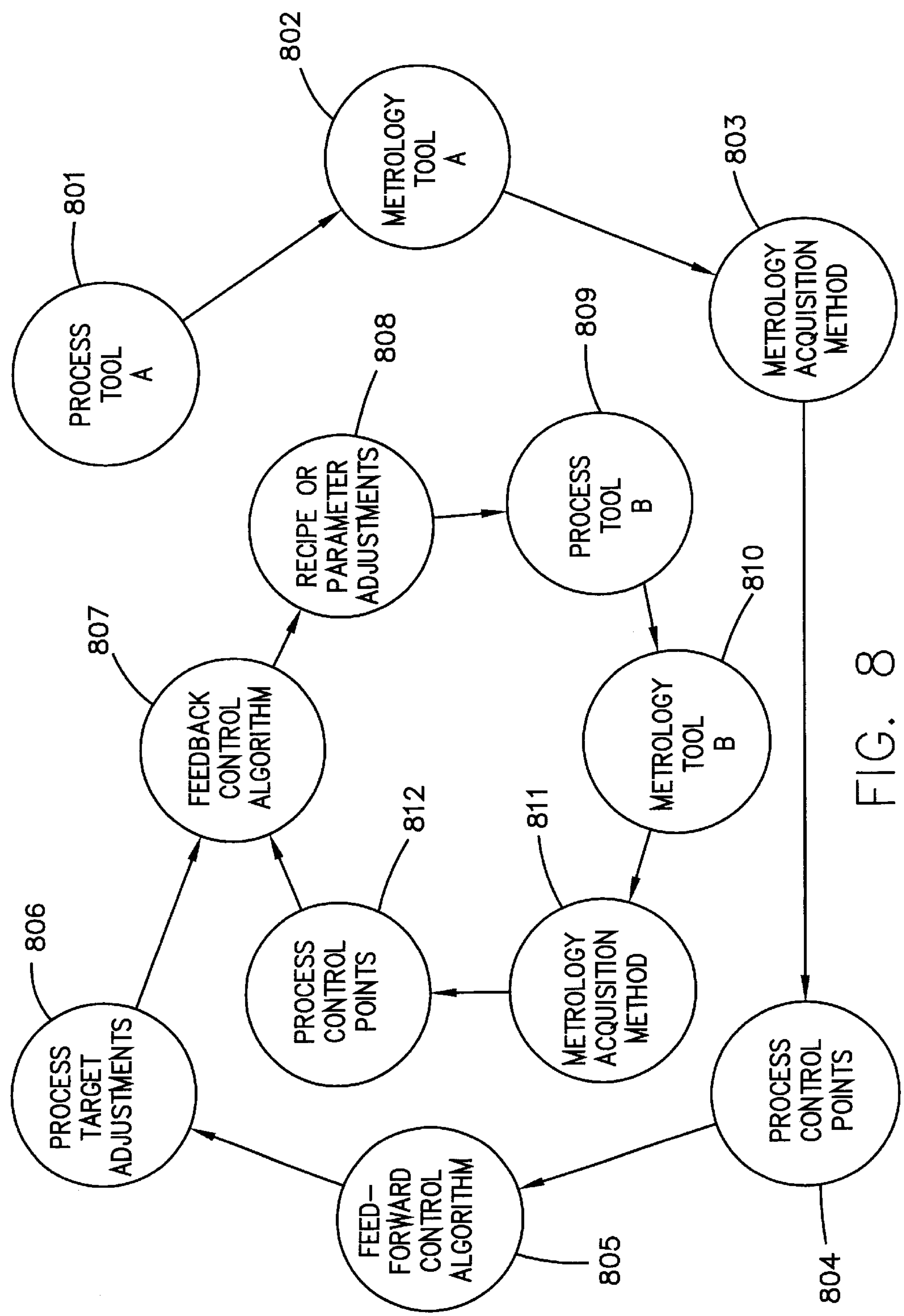
FIG. 8 is a process flow diagram illustrating the run-to-run control process of FIG. 6 from an alternative perspective.

FIG. 8 is a process flow diagram illustrating the run-to-run control process of FIGS. 6A and 6B from an alternative perspective. In the run-to-run process 800 depicted in FIG. 8, both feed-forward and feedback control may be utilized to control the operation of a process tool (designated Process Tool B in FIG. 8). In a first step 801 in the run-to-run process 800, a first process tool (designated Process Tool A) performs processing according to the process variables downloaded to the tool from the Variable Parameter Table (VPT) associated with the particular recipe. In a next step 802, a first metrology tool (designated Metrology Tool A) measures the appropriate output of Process Tool A, depending upon its nature. The measurements from Metrology Tool A are collected in step 803, according, for example, to any of the metrology acquisition methods previously described with reference to FIGS. 6A and 6B. In a next step 804, the process control points (i.e., target) for the upcoming feed-forward and/or feedback run-to-run algorithms are set, based upon the information stored in the metrology maps. In the following step 805, the selected feed-forward control algorithm is applied by the ESW 30, resulting in feed-forward control model outputs. These outputs are used to adjust the process targets, in step 806, for the upcoming feedback control algorithm. In one aspect, the feed-forward control algorithm provides the capability of generating a "variable" process target for a process controlled by a closed-loop feedback control loop.

Once the process targets have been adjusted based on the outputs of the feed-forward control algorithm, the feedback control algorithm of the run-to-run controller may be applied in step 807. In a next step 808, the process variables or parameters for the recipe are adjusted in the variable parameter table (VPT), and the updated variables or parameters are downloaded to Process Tool B. In step 809, Process Tool B performs its assigned task(s) utilizing the variables or parameters associated with the process recipe. In a next step 809, a second metrology tool (designated Metrology Tool B) is used to measure the appropriate output of Metrology Tool B, depending upon its nature. The metrology data from Metrology Tool B is acquired in a next step 811, according, for example, to any of the metrology acquisition methods previously described herein. Based upon the acquired metrology data, the process control points for the feedback control algorithm are adjusted in step 812. The closed-loop feedback control process then returns to step 807, wherein the feedback control algorithm is applied again. The feedback control algorithm continues to control the process target(s) for Process Tool B in a closed-loop fashion, but periodically the process target(s) may be adjusted based upon the measured output(s) of Process Tool A, and the feed-forward control algorithm depicted in step 805 of FIG. 8.

Depending on the metrology data and the process adjustment mechanism, the ARRC system can make process adjustments at varying frequencies. For batch tools the ARRC system preferably adjusts the parameters on a batch-to-batch basis. For single wafer tools, the ARRC system may adjust the parameters on a lot-to-lot and, if needed, wafer-to-wafer basis.

It is also useful to have an additional software application available to analyze the past performance of the ARRC methods. To this end, the ESW 30 may be provided with an ARRC Historical Analysis application. The ARRC Historical Analysis application allows the user to view the results of a single ARRC method by selecting a tool, zone, recipe name and the associated variable parameter. For feedback methods, the plot graphically displays the target value, model prediction, actual measurement, and alarm and block download limits. Preferably, the plot is color-coded. For feed-forward methods, the plot graphically displays the adjustments being made to the next process (stair step plot) over time. In both feedback and feed-forward, colored event squares may be placed at the bottom of the plot at the point in time where an adjustment was made, as well as when, for example, an alarm or block download event occurred. When the user clicks on these squares, another window may appear displaying the details of the particular event.

The foregoing system has been successfully applied in a wet-oxidation process and has shown the ability to improve its accuracy and uniformity. Although multivariable in nature, the control problem faced in a wet-oxidation process can be effectively reduced into a set of scalar problems, allowing the use of simple and reliable ARRC control methods. For the implementation of run-to-run control, the ARRC system provided an integrated and user-friendly tool to perform modeling, adaptation and control.

In this wet-oxidation process, a silicon oxide layer was grown on a load of wafers inside a diffusion furnace via a wet oxidation process. In such a process, silicon wafers are exposed at high temperatures to steam created by burning a controlled mixture of hydrogen and oxygen using a flame or torch. The wafers were loaded into the furnace and were processed for a specified time period at a given temperature. A real-time controller was used to maintain the processing temperature at the selected value, with thermocouple measurements obtained at three different locations across the wafer load. Upon completion of the process, the oxide growth was measured at four locations across the wafer load. The process parameters affecting the growth include the processing time and the three temperature zone set-points. The objective was to adjust these processing parameters in order to maintain the desired oxide growth uniformly across the wafer load.

One difficulty associated with this problem is the complexity of the process model, including a loss of symmetry due to the additional heat in the source zone generated by the torch and the thermal losses in the load zone. In addition, the process characteristics vary with the number of processed wafers (due to, e.g., thermocouple drift or element degradation). To compensate for modeling errors and slow process drifts, a run-to-run controller constructed in the manner set forth above was employed to adjust the "control inputs" (oxidation time and temperature set-points), using growth measurements after each run as the metrology inputs and a simple process model to adjust the recipe parameters defined in the VPT.

Formulating the wet-oxidation process as a feedback control problem, the ARRC system seeks to compute and refine the value of the "control input" so as to drive and maintain the process output value to a desired level. As a matter of general terminology, feedback control considers a "process" or a "system" which, given an "input," produces an "output." The input or control is the signal that can be manipulated in order to effect a change in the output. The output is the signal of interest that can be used to define the desired operation of the process. The desired operation can often be quantified by comparing the output of the process to a "target" or "reference" value. For example, in the wet-oxidation feedback control problem, the control inputs are the time of oxidation and the oxidation temperature. The outputs are the oxide thickness at different locations across the wafer load, measured at process completion, while the reference is the desired value of oxide thickness.

For the oxidation process, the whole temperature trajectory may be thought of as the control input. This would, however, be rather inconvenient as it increases the dimensionality and difficulty of the problem. On the other hand, given that the temperature is held at a prescribed value by the local real-time controller, the whole trajectory could simply be replaced by a single number, that being the temperature set-point. The level of accuracy of the models obtained by such a formulation relies upon the ability of the local real-time controller to maintain the set-point temperature despite any disturbances entering the process.

Mathematically, the relationship between inputs and outputs takes the form of a memoryless nonlinearity, $$y_k=f[u_k]$$

where f[.] is a usually nonlinear function. In this framework, the control objective could be defined as to select $u_k$ so that $y_k$ stays close to a prescribed desired value $r_k$, where k is an index signifying the run number. Since mathematical models, especially the simple ones, generally serve as approximations of a physical process, nominal values of control inputs (e.g., computed by solving the equation $f[u_k]-r_k=0$) ordinarily will only approximately satisfy the control objective. In addition, disturbances or changes in the process (e.g., due to aging) can adversely affect the model quality and lead to an increase of the error $r_k-y_k$.

There are two complementary approaches to remedy this situation. One is to use the approximate model to compute an approximate correction, which eventually drives the error to zero; this is referred to as control input refinement. The other approach is to improve the model quality, referred to as model refinement, and use the new model to compute the new control input. The ARRC methods can be used to implement either or both of these approaches. However, the choice of the approach is problem-dependent, as both have limitations that may potentially produce an undesirable response.

The design of ARRC method in the present example relies on the theory of adaptive system identification and parameter estimation to perform model refinements, and the theory of feedback control and numerical optimization to perform the control input refinements. In its general form the ARRC method implementation involves four steps: model development, control input initialization, model refinement, and control input update. Depending on the user's preference, these steps can be implemented in several different sequences to control the process output, e.g., process monitoring, one-shot-modeling, non-adaptive control, and adaptive control. Some remarks on each of the four basic steps are discussed below.

With respect to model development, the model structures that are implemented in the exemplary ARRC system are single-input, single-output polynomial models with fully or partially adjustable parameters. In general, the process model takes the form:

$$y_k=f[_{uk},\theta]$$

where (u, y) is the input-output pair, and θ is a vector of adjustable parameters. For computational convenience and reliability, the function (., θ) is chosen to be linear or affine in the parameter θ. As a consequence, simple and reliable least-squares computations may be used to estimate the model parameters from data. While more general model structures are certainly possible within the ARRC system framework described above, simple models are usually adequate for many intended applications. Operating ranges are often small enough to allow a good approximation of the input/output process behavior by affine functions.

In the modeling step, the parameters of the user selected model structure are estimated to fit a set of input/output pairs. The estimation is performed using a least squares approach, slightly modified for numerical robustness. Together with the estimated model parameters, a set of fitting errors is computed (RMS and normalized RMS). These define the quality of fit in a way that allows an easy selection of the most suitable model and avoid "over-parameterization." It should noted that over-parameterization depends not only on the characteristics of the underlying process but on the range of the possible inputs as well. The fitting error measures also provide guidelines for the selection of control and/or adaptation thresholds (dead-zones) so that no action is taken when the output variation is within the normal noise level. Finally, in this stage, "conditioning" transformations are computed for use in the adaptation and control steps. These transformations are important in improving both the reliability of the numerical computations and the speed of convergence.

With respect to control input update, the computation of the control input uses an algorithm falling in the class of gradient/Newton algorithms for solving nonlinear equations. Newton-type algorithms have excellent convergence properties near the solution and convergence is not very sensitive to model inaccuracies, as long as the derivative (dfldu) of the model is "close" to the derivative of the actual process. However, several modifications are made in this exemplary application, including a "gain" parameter serving, in a colloquial sense, as a "knob" to adjust the sensitivity of the method to noise. The general form of the control input update is $$\upsilon_{\kappa+1}=\upsilon_{\kappa}+\gamma_{\chi}\omega_{\chi,\kappa}\epsilon_{\chi,\kappa}/(1+\gamma_{\chi}\omega_{\chi,\kappa}'\omega_{\chi,\kappa})$$

where $e_{c,k}$=Dzn[$r_k$−$y_k$], $w_{c,k}$=df/du[$u_k$,$\theta_k$]. The term Dzn[.] denotes a dead-zone nonlinearity whose threshold is selected based on the noise RMS level computed in the model development stage. The gain $\gamma_c$ is computed from the error via the following expression:

$$\gamma_c=\gamma(e_{c,k}/\gamma_{dz})^2/(1+(e_{c,k}/y_{dz})^2)$$

where y>0 and $\gamma_{dz}$, is a threshold parameter selected based on the noise RMS level. This nonlinear gain definition acts effectively as a smooth dead-zone. Its key attribute is that when the error is large, then the control updates are made with high gain (equal to $\gamma$). When the error is small and most of its contribution is due to noise, the updates are made with low gain which, effectively, acts as a low-pass filter and prevents excessive control input adjustments.

The control input update method can be used in two modes. During normal operation, only one step of the iteration is performed. On the other hand, for the first step after maintenance operations the iteration is allowed to converge (control initialization).

A further step in the design of adaptive systems is the selection of the parameter update method, involving tradeoffs among flexibility, noise induced parameter drifts, speed of convergence and noise filtering properties. The ARRC method used to perform the update of the model parameters is a modified fading memory least-squares, incorporating dead-zones and parameter constraints. The general form of the parameter update method is as follows:

$$\theta_{k+1}=\Pi\{\theta_k+\gamma_p P_k^{-1}w_{p,k}e_{p,k}/(1+\gamma_p w_{p,k}'P_k^{-1}w_{p,k})\}$$

$$P_{k+1}=\alpha P_k+(1-\alpha)Q+\gamma_p\alpha w_{p,k}w_{p,k}'$$

where $e_{p,k}$=Dzn[$y_k$−$w_{p,k}'\theta_k$], $w_{p,k}$=df/dθ[$u_k$,$\theta_k$]. The computation of the adaptation gain $\gamma_p$ is analogous to the control gain. The term Π( . . . ) denotes an oblique projection operator on the parameter constraint set. The term Q represents a small positive definite matrix serving to ensure that $P_k$ is always nonsingular and a ϵ[0,1] is a forgetting factor.

The dead-zone serves as an "information screening" mechanism by ignoring data that contain little new information. Parameter constraints have usually the form of bounds on the acceptable parameter estimates and serve to increase the robustness of the algorithm against noise-induced parameter drifts.

Dead-zone thresholds, parameter constraints and scaling/conditioning transformations can be selected by the user during the initial modeling phase. In particular, parameter conditioning transformations can help to reduce the condition number of the Hessian P and, thus, improve the convergence properties of the parameter estimator. They should be carefully applied, however, as they may increase the susceptibility of the algorithm to noise. Furthermore, parameter constraints can be motivated by physical principles (e.g., sign of df/du).

As previously noted, the ARRC methods were used to control a wet oxidation process. One of the main characteristics of such processes is the loss of symmetry due to the thermal gradient across the furnace, causing non-uniform oxide thickness distribution along the wafer load. A common remedy of this situation is to use different temperature set-points in the three heating zones, compensating for the variability of the oxidation rates. This procedure, referred to as "temperature tilting," often requires extensive experimentation and periodic re-tuning; as such, it was selected as a good candidate to investigate the benefits of run-to-run control.

For the process used in this web-oxidation example, the control inputs were the oxidation time and the two end-zone temperature set points, while the set point of the center zone was kept constant at 950 degrees C. Four test wafers were used in each run, and the oxide thickness was measured at different locations on each test wafer. Using a standard experimental design, a set of 23 preliminary measurements was obtained for different inputs from which a preliminary model was built. Guided by these measurements, the process inputs and outputs were defined as follows:

- y(1)=Average oxide thickness for the middle two test wafers.
- y(2) and y(3)=Difference between the average oxide thickness of the side test wafers and y(I) (Å).
- u(1)=processing time (minutes). u(2) and u(3)=Temperature differential of the side zone set-points from center zone (degrees C).

The rationale behind these definitions was to obtain a square model with a diagonally dominant and reasonably conditioned Hessian. The diagonal dominance is not necessary, but it helps to simplify the multivariable control problem by approximating it by a set of scalar control problems.

Figure 3:
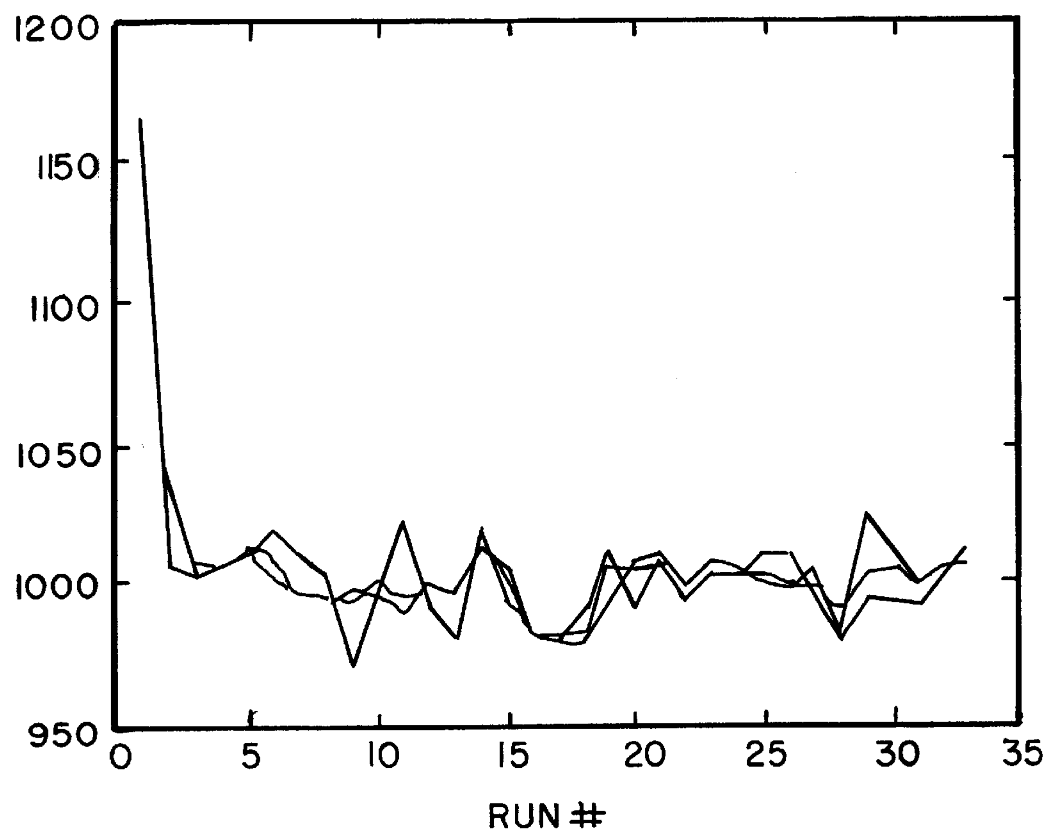
FIGS. 3 and 4 are graphs illustrating the result of an implementation of the run-to-run controller of the present invention as applied to an exemplary wet oxide deposition process.
Figure 4:
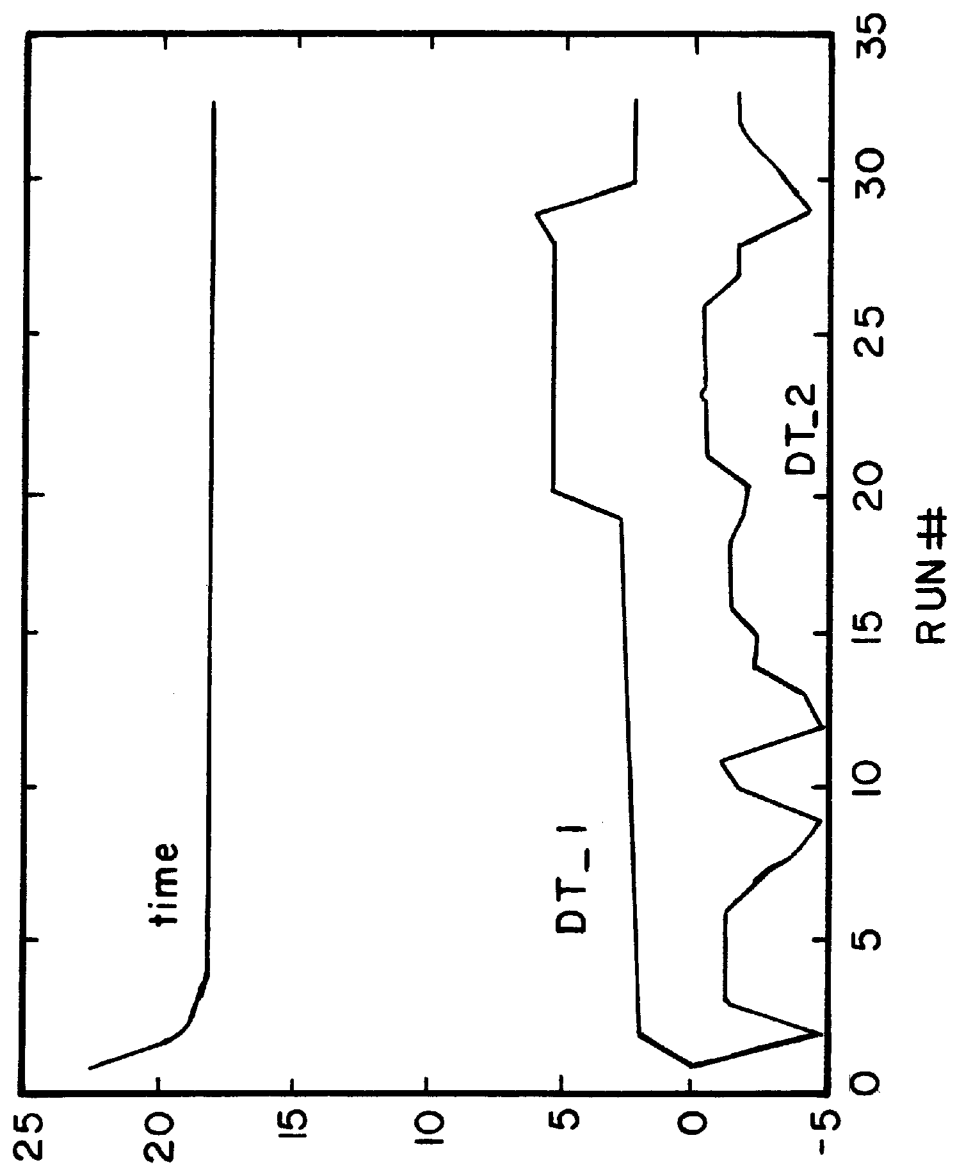

The ARRC method was then tested by processing a total of 33 loads of 200 wafers each. A non-adaptive controller was used for the first 22 loads, while an adaptive controller was used for the last eleven. In all cases, the target was an oxide thickness of 1000 Å in all processing zones. In order to demonstrate the convergence properties of the controller the initial processing time was selected to produce a 15% thickness error while all temperature set-points were identical. The results of the test are shown in FIGS. 3 and 4. After a very short transient, the thickness error becomes comparable to the normal noise level. Moreover, the control input updates are reasonably smooth. These results compare favorably with normal operation data of similar processes, where SPC-based recipe adjustments are performed. It is thus apparent that the foregoing advanced run-to-run control methods provide a significant advantage in yielding accurate and predictable process results.

Other examples also illustrate the benefits of incorporated the aforementioned advanced run-to-run control techniques, using either or both of feedback and feed-forward control techniques. Relatively simple feedback controllers used within the ARRC system can significantly improve process performance and productivity in many areas of the production environment. For example, in chemical mechanical polish (CMP) operations, the polish time may be adjusted to control the remaining thickness of the film. The polish time may be changed between wafers or between batches depending on the stability of the process. When wafer-to-wafer adjustments are required, in-situ metrology would be needed to provide measurements in time to close the loop. If the process drift is understood, however, a feedback model may be used to predict and adjust the polish time required for each wafer in a batch. The polish time can be changed from wafer to wafer, using a feedback control algorithm implemented by the ARRC system, based on the model estimates and then verified with metrology after the batch has been completed. Feedback controllers can also be used within the ARRC system to automatically compensate for the changes in the slurry and degradation of the polish pads.

As another example, diffusion processes may benefit from employing the run-to-run control techniques described herein. Diffusion processes can at times require the adjustment of multiple variables simultaneously. Low pressure chemical vapor deposition (LPCVD) batch processes, for example, typically require temperature and time adjustments. A feedback controller employed within the ARRC system can be used to adjust end zone temperatures to minimize the thickness differences between wafers processed in the center of the furnace and the end zones of the furnace. The feedback controller may also adjust deposition time to center the process at the desired thickness target. Simple models are effective in both linear LPCVD deposition processes and non-linear oxidation processes.

Feedback adjustments made within the context of the ARRC system are also useful in etch processes to control critical dimension (CD) line widths. Also, many etch processes use in-situ end point detection. Once end point has been established, the recipe will continue to etch the film for a pre-defined over-etch time. The impact of the end point time and the over etch time is measured in film thickness and CDs. Automatic feedback control within the ARRC system can be applied to adjust timed etch processes or the over-etch time in end point driven processes. The relationship between film thickness removed and CDs to etch process parameters such as etch time, gas flow and power can be modeled and controlled using the ARRC system.

Although a process may be able to produce repeatable results utilizing a feedback control methodology, the process results may also be dependent on the initial state of the wafers. Automatic adjustment based on this initial state can be accomplished with feed-forward modeling. If a feed-forward control algorithm is used, the process being controlled is preferably either inherently stable or else utilizes an effective feedback mechanism (e.g., an ARRC system feedback control algorithm) to provide stability.

One example where a feed-forward control mechanism is useful is in the adjustment of the etch time to remove the inter-level dielectric for a via interconnect. This type of etch process generally cannot be controlled with in-situ end point detection because the small amount of film being removed does not provide the needed signal strength. Instead, the process preferably is such that it removes all of the film in the first attempt. The initial thickness of the film is generally needed to select the target for the process. This information can be provided by the ARRC system with a feed-forward process in which the initial film thickness is measured, which in turn sets a target for a feedback control loop for the removal of the inter-level dielectric.

Another example in which feed-forward control within the context of the ARRC system would be useful is in chemical mechanical polish (CMP) processes. In such processes, there are typically variations in initial surface material, which in turn results in a similar variation after the polish. By measuring the wafer prior to the polish, a feed-forward controller within the ARRC system can be used to adjust the feedback controller target (amount of material to be polished) after each run, so as to eliminate or at least minimize this variation after the polish.

As yet another example in which feed-forward control within the context of the ARRC system would be useful, implant barrier variations prior to sacrificial oxide layer growth can be controlled to improve fabrication of transistors and similar semiconductor devices. In this regard, implant barrier variations in the fabrication process can adversely effect the gain of a transistor. In a typical fabrication example, oxide and nitride layers are grown and deposited on a wafer. Using lithography and etch processes, trenches are formed in the nitride layer. In forming the trench, the nitride is over-etched resulting in removal of some of the initial oxide layer. A sacrificial oxide layer is grown in the trench over this initial oxide, making a barrier for the implant step. The size of this implant barrier varies from run to run due to the over etch of the nitride. Using a feed-forward control algorithm within the ARRC system, the incoming variation caused by the oxidation and nitride etch steps can be minimized by first measuring the initial oxide layer after the nitride etch, and then, using a feed-forward controller, adjusting the target of the feedback controller on the sacrificial oxide process to maintain a more consistent implant barrier.

In the lithography area, feed-forward control as implemented by the ARRC system can be utilized to calculate alignment parameters from wafer to wafer, thereby providing improved possibilities for processing downstream using feedback control. There are typically six to eight parameters that can be predicted with first order models. Tilt may also be adjusted, but generally requires a much more complex model.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A run-to-run control system for controlling manufacturing processes, comprising:

a plurality of processing tools;

a plurality of metrology tools for monitoring operation of said processing tools each metrology tool adapted to obtain metrology data from a corresponding processing tool; and a supervising station, said supervising station comprising:

an interface for receiving metrology data from each of said metrology tools;

a memory;

a plurality of variable parameter tables, one for each of said processing tools, stored in said memory, said variable parameter tables collectively associated with a manufacturing process or recipe, each variable parameter table being downloaded to a respective processing tool prior to operation of the respective processing tool; and at least one model structure relating received metrology data received from a prior metrology tool to a target set-point for a subsequent processing tool, and another model structure adapted to control operation of the subsequent processing tool in a feed-back control loop, wherein one or more variables of a subsequent variable parameter tables associated with the subsequent processing tool are modified in response to application of said received metrology data according to said at least one model structure.

2. The run-to-run controller of claim 1, wherein said at least one model structure comprises a feedback control model.

3. The run-to-run controller of claim 1, wherein said at least one model structure comprises a feed-forward control model.

4. The run-to-run controller of claim 1, wherein said at least one model structure comprises both a feedback control model and a feed-forward control model.

5. The run-to-run controller of claim 1, further comprising a user interface for selecting one or more model formats from which said at least one model structure is generated.

6. The run-to-run controller of claim 1, further comprising an interface for receiving said at least one model structure from an external plug-in unit.

7. The run-to-run controller of claim 1, wherein all or part of each variable parameter table is downloaded to its corresponding processing tool prior to operation of the processing tool, and wherein said variables modified in response to said received metrology data are automatically downloaded to said processing tools without user intervention being required.

8. The run-to-run controller of claim 4, wherein said supervising station further comprises a target set-point associated with said feedback control model, said supervisory station adjusting said target set-point based upon an output of said feed-forward control model.

9. The run-to-run controller of claim 5, wherein said one or more model formats are interactively selectable from a plurality of predefined model formats, said predefined model formats comprising a linear model format, a quadratic model format and a cubic model format.

10. The run-to-run controller of claim 9, wherein a fading-memory least-squares algorithm is used to determine model parameters for said at least one model structure from experimental data.

11. The run-to-run controller of claim 9, wherein said at least one model structure comprises a multi-input, multi-output model.

12. The run-to-run controller of claim 10, wherein said at least one model structure is user-adjustable with a dead-zone non-linear gain adjustment.

13. The run-to-run controller of claim 10, wherein said at least one model structure may be user-defined as either least squares adaptive, gradient adaptive or non-adaptive.

14. The run-to-run controller of claim 10, wherein process noise and model integrity metrics for said at least one model structure are displayed by said user interface.

15. The run-to-run controller of claim 10, wherein said model parameters for said at least one model structure are user-adjustable between runs.

16. A method for controlling a manufacturing process, comprising the steps of:

(a) downloading variables form a plurality of variable parameter tables to a plurality of processing tools prior to operation of each tool;

(b) operating said processing tools according to said downloaded variables;

(c) receiving, at a supervisory station, metrology data from a plurality of metrology tools monitoring operation of said processing tools;

(d) applying said metrology data to at least one model structure relating said metrology data to said variables including a target set-point for a next processing tool, and generating an output thereby; and (e) updating one or more of said variable parameter tables in response to said output and controlling operation of the next processing tool using another model structure associated with the next processing tool in a feed-back control loop.

17. The method of claim 16, wherein steps (a) through (e) are repeated to effectuate run-to-run control of the manufacturing process.

18. The method of claim 16, wherein step (d) comprises the step of applying said metrology data to a feedback model.

19. The method of claim 16, wherein step (d) comprises the step of applying said metrology data to a feed-forward model.

20. The method of claim 16, wherein step (d) comprises the step of applying said metrology data to both a feedback model and a feed-forward model.

21. The method of claim 16, wherein step (c) comprises the step of automatically transferring said metrology data from said metrology tools to said supervisory station.

22. The method of claim 16, further comprising the step of setting a target set-point for said at least one model structure.

23. The method of claim 16, wherein each of said variable parameter tables is associated with exactly one of said processing tools.

24. The method of claim 16, wherein each of said metrology tools is associated with exactly one of said processing tools.

25. The method of claim 16, further comprising the step of interactively selecting said at least one model structure via a user interface from a plurality of predefined model formats.

26. The method of claim 25, wherein said predefined model formats comprise a linear model format, a quadratic model format and a cubic model format.

27. The method of claim 22, wherein step (e) comprises the step of adjusting said one or more of said variable parameter tables in response to a comparison between said output and said target set-point.

28. The method of claim 25, wherein said at least one model structure may be user-defined as either least squares adaptive, gradient adaptive or non-adaptive.

29. The method of claim 25, further comprising the step of displaying process noise and model integrity metrics at said user interface.

30. The method of claim 25, wherein said at least one model structure comprises a multi-input, multi-output model.

31. The method of claim 26, further comprising the step of determining model parameters for said at least one model structure from experimental data using a fading-memory least-squares algorithm.

32. The method of claim 26, further comprising the step of adjusting said model parameters for said at least one model structure between runs.

33. A run-to-run controller for controlling a manufacturing process, comprising:

a first processing tool;

a first metrology tool for obtaining metrology data from said first processing tool;

a second processing tool;

a second metrology tool for obtaining metrology data from said second processing tool; and a supervisory station, said supervisory station comprising an interface for receiving said metrology data from said first metrology tool; and a first model structure relating said metrology data from said first metrology tool to a target set-point for said second processing tool;

a second model structure used in controlling operation of said second processing tool in a feed-back control loop; and a first variable parameter table for said first processing tool and a second variable parameter table for said second processing tool;

wherein all or part of said first variable parameter table is downloaded to said first processing tool prior to operation of said first processing tool, wherein all or part of said second variable parameter table is downloaded to said second processing tool prior to operation of said second processing tool, and wherein one or more variables in said second variable parameter table are modified in response to application of said first model structure to said received metrology data.

34. The run-to-run controller of claim 33, wherein said supervisory station adjusts table parameters in said second variable parameter table in response to the metrology data from said second metrology tool in order to maintain operation of said second processing tool at a desired target point.

35. The run-to-run controller of claim 33, further comprising an interface for receiving said first model structure or said second model structure, or both, from an external plug-in unit.

36. The run-to-run controller of claim 33, further comprising a user interface for selecting one of a plurality of predefined model formats from which said first model structure is generated.

37. The run-to-run controller of claim 36, wherein said plurality of predefined model formats include a linear model format, a quadratic model format and a cubic model format.

38. A method of controlling a manufacturing process, comprising the steps of:

(a) obtaining metrology data from a first metrology tool with respect to a first processing tool;

(b) applying said metrology data to a first model structure relating said metrology data to a target set-point for a second processing tool and using a second model structure to control operation of the second processing tool in a feed-back control loop;

(c) modifying one or more variables in a variable parameter table for said second processing tool in response to application of the first model structure to the received metrology data;

(d) downloading said one or more modified variables to said second processing tool;

(e) operating said second processing tool in accordance with said downloaded variables.

39. The method of claim 38, wherein steps (a) through (e) are repeated to effectuate run-to-run control of the manufacturing process.

40. The method of claim 39, further comprising the steps of:

obtaining metrology data from a second metrology tool with respect to said second processing tool;

applying said metrology data from said second metrology tool to a second model structure relating said metrology data from said second metrology tool to said target set-point for said second processing tool; and modifying one or more variables in said variable parameter table for said second processing tool.

41. The method of claim 40, wherein said step of applying said metrology data from said second metrology tool to said second model structure comprises the step of applying said metrology data from said second metrology tool to a feedback model.

42. The method of claim 40, further comprising the step of selecting, via a user interface, a model formats from among a plurality of model formats from which said second model structure is generated.

43. The method of claim 42, wherein said plurality of model formats comprise a linear model format, a quadratic model format and a cubic model format.

44. A supervisory station for managing run-to-run control of a manufacturing process, comprising:

an interface for receiving metrology data from a plurality of said metrology tools;

a control model relating said metrology data from one metrology tool to a target set-point for a next processing tool;

another control model used in controlling operation of said next processing tool in a feed-back control loop; and a memory, said memory storing a plurality of output control variables for controlling the operation of a plurality of processing tools; and at least one processor for executing one or more processes for controlling said metrology tools by adjusting said output control variables based upon the received metrology data and one or more control models, said control models selectable from a plurality of control model formats stored in said memory wherein one or more control variables for controlling the operation of the next processing tool are modified in response to application of the control model to the received metrology data.

45. The supervisory station of claim 44, wherein a control model is selected individually for each processing tool, each control model relating some or all of the received metrology data to output control variables for a particular processing tool according to the control model selected for the particular processing tool.

46. The supervisory station of claim 44, wherein said control model formats include a feedback control model.

47. The supervisory station of claim 44, wherein said control model formats include a combined feedback control model and a feed-forward control model.

48. The supervisory station of claim 44, further comprising a user interface for selecting the control model for each processing tool from the available control model formats.

49. The supervisory station of claim 44, wherein said control model formats include a linear model format, a quadratic model format and a cubic model format.

50. The supervisory station of claim 44, further comprising an interface for receiving one or more of the control model formats from an external plug-in unit.

51. The supervisory station of claim 44, wherein all or part of each variable parameter table is downloaded to its corresponding processing tool prior to operation of the processing tool, and wherein said variables modified in response to said received metrology data are automatically downloaded to said processing tools without user intervention being required.

52. The supervisory station of claim 45, further comprising plurality of variable parameter tables, one for each of said processing tools, stored in said memory, said variable parameter tables collectively associated with a manufacturing process recipe.

53. The supervisory station of claim 46, wherein said control model formats include a feed-forward control model.

54. The supervisory station of claim 47, further comprising a target set-point associated with said feedback control model, said supervisory station adjusting said target set-point based upon an output of said feed-forward control model.

55. The supervisory station of claim 52, wherein each control model relates some or all of the received metrology data to one or more variables of one of the variable parameter table for the control model's corresponding processing tool, whereby said variables are modified in response to the received metrology data according to the control model.

56. The supervisory station of claim 55, wherein all or part of each variable parameter table is downloaded to its corresponding processing tool prior to operation of the processing tool, and wherein said variables modified in response to said received metrology data are automatically downloaded to said processing tools without user intervention being required.

* * * * *